(12) United States Patent
Waltenberg et al.

(10) Patent No.: US 8,065,724 B2
(45) Date of Patent: Nov. 22, 2011

(54) COMPUTER METHOD AND APPARATUS FOR AUTHENTICATING UNATTENDED MACHINES

(75) Inventors: Peter Theodore Waltenberg, Robina (AU); Kenneth Stephen, Round Rock, TX (US); Timothy Simon Bartley, Worongary (AU)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 11/956,761

(22) Filed: Dec. 14, 2007

(65) Prior Publication Data

US 2009/0158389 A1    Jun. 18, 2009

(51) Int. Cl.
*H04L 9/32* (2006.01)
*G06F 21/00* (2006.01)
*G06F 12/14* (2006.01)

(52) U.S. Cl. ............... 726/19; 726/18; 726/27; 713/193
(58) Field of Classification Search .................. None
See application file for complete search history.

(56) References Cited

U.S. PATENT DOCUMENTS

| | | | |
|---|---|---|---|
| 6,182,223 B1 * | 1/2001 | Rawson | 726/22 |
| 6,804,666 B2 * | 10/2004 | Morita et al. | 1/1 |
| 7,343,327 B2 * | 3/2008 | Morita et al. | 705/27 |
| 7,512,549 B1 * | 3/2009 | Morita et al. | 705/26 |
| 7,797,456 B2 * | 9/2010 | Morita et al. | 709/248 |
| 2004/0064728 A1 * | 4/2004 | Scheurich | 713/201 |
| 2004/0123151 A1 | 6/2004 | Mizrah | |
| 2005/0203921 A1 | 9/2005 | Newman et al. | |
| 2006/0282660 A1 | 12/2006 | Varghese et al. | |
| 2007/0086257 A1 * | 4/2007 | Bernier et al. | 365/218 |
| 2007/0277240 A1 * | 11/2007 | Durfee et al. | 726/24 |

OTHER PUBLICATIONS

Seleznyov, A., et al., "Using Continuous User Authentication to Detect Masqueraders," *Information Management & Computer Security*, pp. 139-145, Nov. 2003.

* cited by examiner

*Primary Examiner* — Christopher Revak
(74) *Attorney, Agent, or Firm* — Jeffrey S. LaBaw; David H. Judson

(57) ABSTRACT

An unattended computer-based machine is authenticated by the present invention method, system or apparatus. The subject machine may be an auto-restarted machine or similar machine configured to be unattended. Upon receipt of initializing input from a user at a subject computer-based machine, a working process authenticates the user and generates resulting credentials. The working process stores the generated credentials in a memory area of the subject machine. Separate from and independent of the working process is a security monitor of the present invention. A monitoring module of the present invention monitors user activity on the subject machine and upon detecting suspect activity destroys the stored credentials of the working process. Suspect activity includes any activity raising a suspicion of compromise.

20 Claims, 2 Drawing Sheets

COMPUTER METHOD AND APPARATUS FOR AUTHENTICATING UNATTENDED MACHINES

BACKGROUND OF THE INVENTION

Authentication of processes or services running on unattended computer-based systems has always been a thorny problem. Having a user authenticate every time processes are started is extremely inconvenient. The alternative is to leave passwords or credentials on the machine and automate logins. That has problems if the machines are compromised as even with technologies like TCPA or smartcards, the authentication tokens are still available on the machine allowing access to anything the uncompromised machine had access to. Unattended processes run in many server farms in the world. Having a human administrator present every time the subject machine or process has to be restarted is not feasible.

SUMMARY OF THE INVENTION

The present invention addresses the problems of prior art. In particular, in the present invention an individual/(real) user authenticates the machine or process and obtains a set of credentials which the machine or process uses to authenticate thereafter. Separate and independent from that process, security processes of the present invention running on the machine (i.e., IMB TAMOS or the equivalent) destroy or otherwise deny access to the credentials in the event of "unexpected" activity (i.e., user-logins, unexpected changes to certain files, and software updates).

In a preferred embodiment, an unattended computer-based machine is authenticated by the present invention method and system (or apparatus) as follows. The subject machine may be an auto-restarted machine or similar machine configured to be unattended. Upon receipt of initializing or other input from a user, a subject computer-based machine (given working process thereof) authenticates the user and generates resulting credentials. The given working process stores the generated credentials in a memory area of the subject machine. For example, the operating system stores the credentials in a predefined memory area. A monitoring module of the present invention operates independently of and separately from the given working process. The monitoring module monitors user activity with the subject machine and upon detecting suspect activity destroys the stored credentials of the working process. Suspect activity includes any one or combination of user login events, unexpected changes to certain files, program updates, single keystrokes, unexpected user activity and activity raising a suspicion of compromise.

In one embodiment, the invention monitoring module destroys effectively all files of a directory storing the credentials in working memory. In another embodiment, the monitoring module destroys a master key of an encrypted files system storing the credentials.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
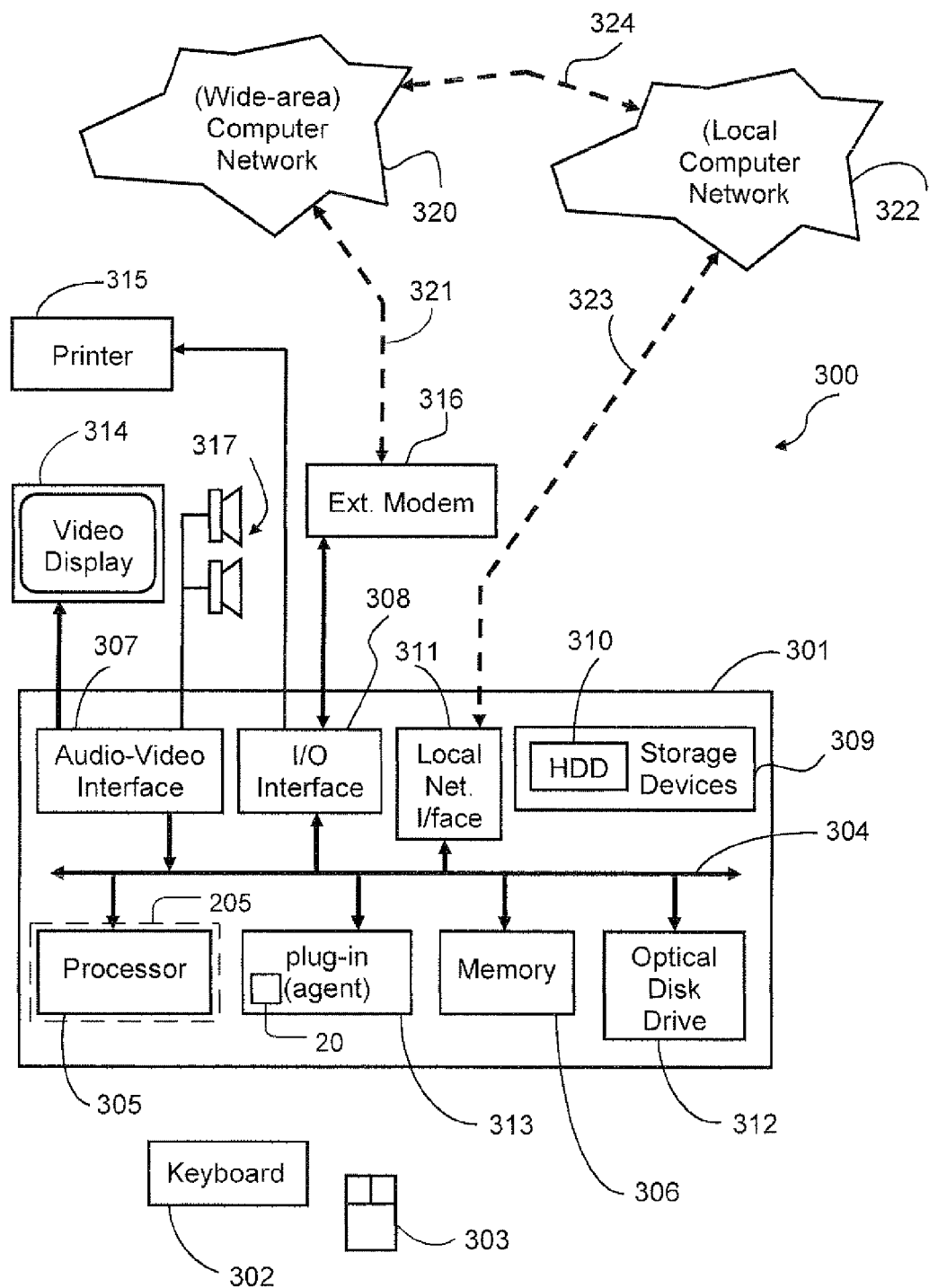
FIG. 1 is a schematic view of an unattended machine embodying the present invention.

The example embodiments may be implemented using a information handling device 300, for example a computer system, such as that shown in FIG. 1. It should be apparent to one skilled in that art that other information handling devices, such as auto-restarted machines, automatic teller machines, farm or other servers, etc., containing at least a processor and a memory and capable of processing data fall within the scope of this invention. The method described below may be implemented as software, such as, as one or more application programs executable within the device 300 or an additional hardware element 313, wherein the software is embedded in the hardware element 313 and is configured to work in conjunction with the operating system of the device. In particular, the steps of the method may be realized by instructions in the software that are carried out within the device 300. The instructions may be formed as one or more program code modules, each for performing one or more particular tasks. The software may be stored in a readable medium, including the storage devices. In one embodiment, the software is loaded into the device 300 from the readable medium, and then executed by the device 300. A readable medium having such software or program recorded on it is defined as a computer program product.

As seen in FIG. 1, the device 300 is formed by a module 301, input devices such as a keypad or keyboard 302 and a mouse pointer (or other cursor control) device 303, and output devices including a printer 315, a display device 314 and loudspeakers 317. An external Modulator-Demodulator (Modem) transceiver device 316 may be used by the module 301 for communicating to and from a communications network 320 via a connection 321. The network 320 may be a wide-area network (WAN) such as the Internet or a private WAN. Where the connection 321 is a telephone line, the modem 316 may be a traditional "dial-up" modem. Alternatively, where the connection 321 is a high capacity (e.g. cable) connection, the modem 316 may be a broadband modem. A wireless modem may also be used for wireless connection to the network 320.

The module 301 typically includes at least one processor unit 305, and a memory unit 306 for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 308 for the keyboard 302 and mouse 303 and optionally a joystick (not illustrated), for the external modem 316 and printer 315, and optionally the hardware element 313 which performs the invention method. In some implementations, the modem 316 may be incorporated within the module 301, for example within the interface 308. The module 301 also has a local network interface 311 which, via a connection 323, permits coupling of the device 300 to a local network 322, known as a Local Area Network (LAN). As also illustrated, the local network 322 may also couple to the wide area network 320 via a connection 324, which would typically include a so-called "firewall" device or similar functionality. The network interface 311 may be formed by an Ethernet™ circuit card, a wireless Bluetooth™ or an IEEE 802.11 wireless arrangement or the like.

The interfaces 308 may afford both serial and parallel connectivity, the former typically being implemented according to the Universal Serial Bus (USB) standards and having corresponding USB connectors (not illustrated). Storage devices 309 are provided and typically include a hard disk drive (HDD) 310. Other devices such as a floppy disk drive and a magnetic tape drive (not illustrated) may also be used. An optical disk drive 312 is typically provided to act as a non-volatile source of data. Portable memory devices, such optical disks (e.g.: CD-ROM, DVD), USB-RAM, and floppy disks for example may then be used as appropriate sources of data to the device 300. A central repository 330 is coupled to the system over the network, where the device is configured to store to a registry and also used as a back-up means for the device to store critical information.

The components 305 to 313 of the module 301 typically communicate via an interconnected bus (system bus) 304 and in a manner which results in a conventional mode of operation of the device 300 known to those in the relevant art. Examples of computers on which the described arrangements can be practiced include IBM-PC's and compatibles, Sun Sparcstations, Apple Mac™ or alike computer systems evolved therefrom.

Typically, the application programs discussed above are resident on the hard disk drive 310 and read and controlled in execution by the processor 305. Intermediate storage of such programs and any data fetched from the networks 320 and 322 may be accomplished using the semiconductor memory 306, possibly in concert with the hard disk drive 310. In some instances, the application programs may be supplied to the user encoded on one or more CD-ROM and read via the corresponding drive 312, or alternatively may be read by the user from the networks 320 or 322. Still further, the software can also be loaded into the device 300 from other readable media, for example computer readable media. Computer readable media refers to any storage medium that participates in providing instructions and/or data to the device 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the module 301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The operations disclosed may alternatively be implemented in dedicated hardware such as one or more integrated circuits performing the functions or sub functions of the described processes. Such dedicated hardware may include graphic processors, digital signal processors, or one or more microprocessors and associated memories.

It should be apparent to a person skilled in the art that the term "device" 300 preferably refers to and includes a variety of devices comprising at least a processor and a memory capable of processing content and is not limited to a variety of electronic devices such as desktop computers, application servers, web servers, database servers and the like; and portable electronic devices such as mobile phones, personal digital assistants (PDAs), pocket personal computers, laptop computers, electronic devices, portable electronic devices, handheld electronic devices etc fall within the scope of the present invention.

The accompanying figures and this description depict and describe embodiments of the present invention, and features and components thereof. Those skilled in the art will appreciate that any particular program nomenclature used in this description is merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

Figure 2:
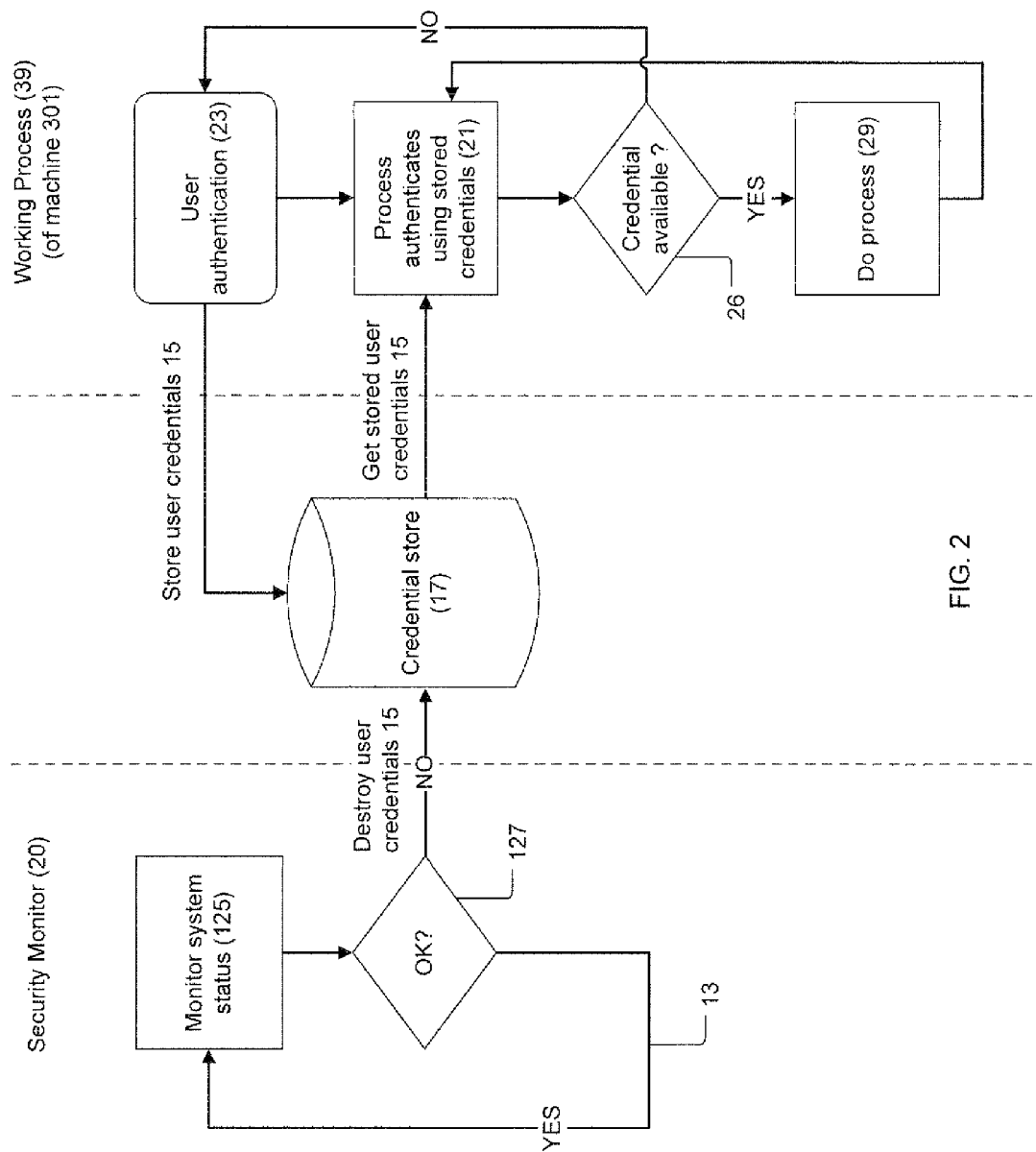
FIG. 2 is a flow diagram of data and control in embodiments of the present invention.

The invention monitoring software or module 20 operates at a security level over the applications executed by processor 305. Example monitoring software in which invention module 20 may be embedded or otherwise included is IBM TAMOS or SELinux, or the like. The monitoring module 20 is configured by the present invention to monitor for and detect compromise. By entering a user name and password or any other known authentication process, an individual user authenticates the machine or process in working memory 306, 309, 310, 312, generally designated 39 (FIG. 2). When the user authenticates the machine or a process 39 (e.g., application or other execution), the operating system 205 or process generates a set of credentials 15 (FIG. 2) for the user which the machine or process 39 (or secure remote service, etc.) uses to authenticate thereafter. Security processes of the monitoring module 20 run in background. In the event that monitoring module 20 detects or suspects unexpected activity, the security process destroys or otherwise denies access to the credentials 15.

Unexpected activity includes user login events, unexpected changes to certain files, software updates, single keystroke and other non-typical (unusual) activity with respect to the post-authentication-of-a-user running (operating) of the machine or process 39. In some embodiments, certain activities may be predefined as "unexpected" or preferably, only certain activities are predefined as "expected" (i.e., qualified expected activities) and any activity other than an "expected" activity is deemed to be "unexpected" and triggers destruction of the credentials 15.

Preferably upon detection or suspicion of a compromise, i.e., the event of an unexpected activity, the security process (invention monitoring module 20) deletes effectively all files in the directory holding the credentials. Or in another embodiment, monitoring module 20 deletes a master key of an encrypted file system holding the credentials 15. Other methods or mechanisms for effectively denying access to credentials 15 are suitable. For example, after authentication of one user, when another user logs on or critical files are altered, the security process/invention monitoring module 20 automatically destroys the credentials spawned by authentication of the one (first) user in the working process 39. The level of detection need only be a 'suspicion' of compromise in order to trigger the security process deleting and destroying the credentials and associated directory files.

Note that this is also extensible to single user machines and the protection of SSO credentials, and is more convenient than time expiration means for security. Provided the machine (or user in the SSO case) behaves within expected parameters, authentication tokens can remain valid, and the security monitoring module 20 can remove the authentication tokens before the machine is compromised. While physical access to the subject device 300 or machine 301 can probably defeat this, the subject machine 301 can be made largely immune to remote attacks.

Thus the present invention provides a significant enhancement to many existing offerings as it provides establishing a trust relationship with an unattended machine/computer-based system 300 or service that is extremely difficult to guarantee by other means.

Embodiments of the present invention may be utilized in high availability systems, single sign-on products, security products and others. For example, the present invention is capable of solving a lot of administration/security audit concerns with unattended/auto-restarted machines; and fits extremely well with high availability systems where processes or machines may need to be restarted automatically to work around long or shot term stability problems.

Turning to FIG. 2, the flow of control and data in embodiments of the present invention is as follows.

In a subject working process 39 (e.g. application execution or other operation of machine 301), user input is received to begin a session. The user input is a login, user identification, password/pass code or other initializing input for example. The subject process 39 responds to the received input and authenticates the user among other initialization at step 23. Known authentication techniques are utilized. The authentication at step 23 produces credentials 15 which the operating system 205 of corresponding machine 301 stores in a predefined directory or work area at memory 17. The credentials 15 may be stored in the form of tokens, objects or following other common data schemes and formats. For example, the credentials 15 in some working processes 39 are stored as a directory (which gets effectively all files in it deleted at a later stage as described below), or in other working processes 39 credentials 15 are stored in an encrypted file system (where the master key is deleted as appropriate as made clear below).

Following authentication at step 23, the subject working process 39 runs 29 according to operation of the device 300 by the user. Working process 39 may at times 21 during operation use the stored credentials 15 to authenticate the user. If the stored credentials 15 are unavailable (step 26) then working process 39 is configured to reauthenticate the user by looping back to step 23.

Meanwhile, independently of and separately from working process 39, the present invention security monitor 20, in background, monitors activity (user activity, interaction with device 300, etc.) and system status (step 125). Specifically step 125 detects activity and determines if a threshold level of suspicion is met (step 127). For example, if predefined expected activities are not met then step 127 sets suspect=true (a threshold flag) and destroys effectively all the files in the directory 17 holding the credentials 15 of working process 39. Or in the case of encrypted credentials 15, step 127 destroys the master key of the encrypted file system of working process 39. Known techniques are used to determine expected activities and to match or categorize/classify or otherwise define the detected activity with respect to the expected activities. State machines, lookup or other tables, and other data structures may be utilized. In another example, step 127 uses common techniques to determine whether the current detected activity is a member of the class of suspect (unexpected) activities or of the class of accepted (predefined, qualified) activities. Other analysis and techniques for making a determination of detected suspect activity at step 127 are suitable.

If no suspicion is determined at step 127 then monitoring module 20 allows the session in progress (step 29) to continue. Invention monitoring module 20 and subject working process 39 continue operating side by side, independent of one another with invention module 20 providing background monitoring as described above (and shown as loop 13 in FIG. 2).

While this invention has been particularly shown and described with references to example embodiments thereof, it will be understood by those skilled in the art that various changes in form and details may be made therein without departing from the scope of the invention encompassed by the appended claims.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer method for authenticating unattended computer-based machines, comprising:
   (a) in a given working process:
      receiving initializing input from a user at a subject computer-based machine;
      based on the received initializing input, authenticating the user, resulting in generated credentials;
      storing the generated credentials in a memory area of the subject machine; and
   (b) independently of the given working process, monitoring user activity on the subject machine and upon detecting suspect activity on the subject machine, destroying the stored credentials of the given working process.

2. The computer method as claimed in claim 1 wherein the generated credentials are stored in a predefined memory area.

3. The computer method as claimed in claim 1 wherein the step of destroying includes:

destroying effectively all files of a directory storing the credentials;

destroying a master key of an encrypted file system; or denying access to the stored credentials.

4. The computer method as claimed in claim 1 wherein the subject machine is an auto-restarted machine or a machine configured to be unattended.

5. The computer method as claimed in claim 1 wherein the suspect activity includes any one or combination of: user login events, unexpected changes to certain files, software program updates, single keystrokes and unexpected activity.

6. The computer method as claimed in claim 1 wherein suspect activity includes activity raising a suspicion of compromise of the subject machine.

7. Computer apparatus for authenticating unattended computer-based machines, comprising:

in a given computer-based machine, an operating system receiving initializing input from a user of the given machine, based on the received initializing input, the operating system (i) authenticating the user for a subject process, (ii) generating respective user credentials and (iii) storing the generated credentials in a memory area of the given machine; and a monitoring module responsive to the operating system and monitoring user activity on the given machine, upon detecting suspect activity, the monitoring module effectively denies access to the stored credentials of the subject process, wherein the monitoring module operates independently of and separately from the subject process.

8. Computer apparatus as claimed in claim 7 wherein the operating system stores the generated credentials in a predefined memory area.

9. Computer apparatus as claimed in claim 8 wherein generated credentials are stored as any one of tokens, objects, files in a directory and an encrypted file system.

10. Computer apparatus as claimed in claim 7 wherein the monitoring module effectively denies access by:

destroying effectively all files of a directory storing the credentials of the subject process, or by destroying any master key of an encrypted file system of the subject process.

11. Computer apparatus as claimed in claim 7 wherein the subject machine is an auto-restarted machine or a machine configured to be unattended.

12. Computer apparatus as claimed in claim 7 wherein the suspect activity includes any one or combination of: user login events, unexpected changes to certain files, software program updates, single keystrokes and unexpected activity.

13. Computer apparatus as claimed in claim 7 wherein suspect activity includes activity raising a suspicion of compromise of the given machine.

14. A computer system for authenticating a computer-based machine, comprising:

credential generating means for, in a given process, (i) authenticating a user based on input received from the user at a subject computer-based machine and (ii) generating resulting credentials; and monitoring means for monitoring user activity on the subject machine, the monitoring means operating separately from the given process, upon detecting suspect activity, the monitoring means substantially destroying the resulting credentials of the given process.

15. A computer system as claimed in claim 14 wherein the credential generating means includes operating system means.

16. A computer system as claimed in claim 14 further comprising:

memory means for storing the resulting credentials from the credential generating means; and the monitoring means substantially denies access to the credentials as stored.

17. A computer system as claimed in claim 16 wherein the monitoring means destroys effectively all files of a directory storing the credentials in the memory means and any master key of an encrypted file system of the given process.

18. A computer system as claimed in claim 14 wherein the subject machine is an auto-restarted machine or a machine configured to be unattended.

19. A computer system as claimed in claim 14 wherein suspect activity includes any one or combination of: user login events, unexpected changes to certain files, software program updates, single keystrokes, unexpected activity and activity raising a suspicion of compromise of the subject machine.

20. A computer program product comprising a non-transitory computer useable medium having a computer readable program which when executed by a digital processor causes the steps of:

in a given process, (i) receiving input from a user at a subject computer-based machine; (ii) based on the received input, authenticating the user, resulting in generated credentials; (iii) storing the generated credentials in a memory area of the subject machine; and separately from the given process, monitoring user activity on the subject machine and upon detecting suspect activity on the subject machine, effectively destroying the stored credentials of the given process, wherein suspect activity includes activity raising a suspicion of compromise.

* * * * *